United States Patent [19]

Hagin et al.

[11] Patent Number: 4,825,722

[45] Date of Patent: May 2, 1989

[54] HYDROMECHANICAL TRANSMISSION FOR MOTOR VEHICLES

[75] Inventors: Faust Hagin; Hans Drewitz, both of Munich; Stefan Martini, Ulm, all of Fed. Rep. of Germany

[73] Assignee: MAN Nutzfahrzeuge GmbH, Munich, Fed. Rep. of Germany

[21] Appl. No.: 76,776

[22] Filed: Jan. 23, 1987

[30] Foreign Application Priority Data

Jul. 24, 1986 [DE] Fed. Rep. of Germany ....... 3624989

[51] Int. Cl.$^4$ ...................... F16H 47/04; F16H 47/00
[52] U.S. Cl. ........................................ 74/687; 74/718; 74/606 R
[58] Field of Search ................ 74/606 R, 687, 720.5, 74/730, 718, 677; 464/159, 158, 156, 154, 162, 140, 189, 99

[56] References Cited

U.S. PATENT DOCUMENTS

| | | | |
|---|---|---|---|
| 2,962,915 | 12/1960 | Wiggermann | 74/687 |
| 3,861,172 | 1/1975 | Symann | 464/89 |
| 3,902,567 | 9/1975 | Pekar Jr. | 74/606 R X |
| 4,181,041 | 1/1980 | Frost | 74/687 |
| 4,313,351 | 2/1982 | Hagin | 74/687 |
| 4,464,141 | 8/1984 | Brown | 464/89 |
| 4,530,674 | 7/1985 | Rauch | 464/156 X |
| 4,563,914 | 1/1986 | Miller | 74/687 |

FOREIGN PATENT DOCUMENTS

| | | | |
|---|---|---|---|
| 2820025 | 11/1979 | Fed. Rep. of Germany | 74/718 |
| 3125122 | 1/1983 | Fed. Rep. of Germany | 74/606 R |
| 2463335 | 3/1981 | France | 74/687 |
| 644642 | 1/1979 | U.S.S.R. | 74/718 |
| 1245790 | 7/1986 | U.S.S.R. | 74/687 |

Primary Examiner—Dirk Wright
Attorney, Agent, or Firm—Scully, Scott, Murphy & Presser

[57] ABSTRACT

The hydromechanical transmission is all in all designed as a power splitting transmission having at least two hydraulic machines adapted to selectively act as pumps and motors, a control or connecting block, epicyclic gearing and various clutches, the hydraulic machines adapted to selectively act as pumps and motors forming a preassembled unit or subassembly with the control or connecting block. The subassembly, the epicyclic gearing, the clutches and any intermediate shaft required are arranged in a unitary manner in a common housing, in which the various elements are surrounded with a small clearance. the hydraulic machines adapted to selectively act as pumps and motors are arranged within the overall length of the epicyclic gearing and are axially parallel thereto.

6 Claims, 1 Drawing Sheet

HYDROMECHANICAL TRANSMISSION FOR MOTOR VEHICLES

BACKGROUND OF THE INVENTION

The invention relates to a hydromechanical transmission with hydraulic and mechanical components for use in motor vehicles similar to those described in the U.S. Pat. No. 4,313,351.

Systems with such components separate from each other and placed individually are known. The connection means between the different components are however then unsatisfactory and require expensive tubular casings and tubes which are a source of trouble. More especially, the level of noise radiated from them tends to be excessive, particularly as regards the hydromechanical machines adapted to selectively act as pumps and motors for power conversion between fluid pressure and shaft-transmitted power.

SUMMARY OF THE INVENTION

One object of the present invention is to devise a mechanical-hydraulic transmission unit which is readily assembled.

A further aim is to provide such a transmission which creates a minimum amount of noise.

A still further object of the invention is to provide such a unit which has a minimum space requirement.

In order to achieve these or other objects appearing from the present specification and claims, the hydromechanical transmission is all in all designed as a power splitting transmission having at least two hydraulic machines adapted to selectively act as pumps and motors, a control or connecting block, epicyclic gearing and various clutches, the hydraulic machines adapted to selectively act as pumps and motors forming a preassembled unit with the control or connecting block and such preassembled unit, the epicyclic gearing, the clutches and any intermediate shaft required are arranged in a unitary manner in a common housing, in which the various elements are surrounded with a small clearance.

When designed in this manner the unit only has a minimum space requirement and is furthermore cheap to preassmble. An important principle of the invention is however the arrangement of the hydraulic machines adapted to selectively act as pumps and motors and the control block as one unit so that with the other components of the transmission they are arranged in a unitary manner in a housing surrounding the elements with a small clearance. It is in this manner, that is to say on the one hand owing to the use of the housing and furthermore on the other hand - this being of equal importance -owing to the combined mass of the two said hydraulic machines and the control block with smaller amplitudes of vibration and favorable properties when considered as mass, that it is possible to ensure a substantial reduction in the noise level, more especially as regards that coming from the hydraulic machines adapted to selectively act as pumps and motors. Owing to the splitting of power by way of the epicyclic gearing with an additional intermediate shaft there is a reduction in the power handled in the hydraulic machines and this in turn leads to a still further reduction in the noise level. Owing to the power shifting between two modes via the intermediate shaft, the overall transformation range is widened and accordingly the amount of power transmitted hydraulically is reduced. By arranging the housing with a small distance between it and the drive elements and more especially the hydraulic machines adapted to selectively act as pumps and motors, there is the particular advantage that the surfaces radiating sound are made as small as possible. Owing to the firm connection between the hydraulic machines adapted to selectively act as pumps and motors and the control block it is possible to dispense with casing tubes and elements thereof, which would have to be inspected from time to time and their bolts tightened up.

In accordance with a significant feature of the invention the hydraulic machines are arranged within the overall length of the epicyclic gearing and parallel to the axis thereof, or putting it differently, they are within the core shadow of the epicyclic gearing. This arrangement is novel and makes it possible to have a particularly short construction of the housing containing the hydraulic and mechanical transmission elements.

In accordance with a supplementary feature of the invention lines connecting the axes of the hydraulic machines adapted to selectively act as pumps and motors and the epicyclic gearing form a triangle, the axes being in a parallel cluster therewith. It is in this manner that it is possible to achieve a minimum space requirement for the transmission elements and as a result the surface from which sound may be radiated is kept as small as possible and the control or connection block may be designed with the smallest possible dimensions.

In accordance with one possible form of the invention using hydraulic machines adapted to selectively act as pumps and motors with bent axles the operating heads are arranged at such an angle that their ends are almost in contact and extend upwards or downwards tangentially in relation to the enveloping circle. It is thus possible to achieve a minimum space requirement for housing the elements even when members are arranged with a complex geometry in the space so that the housing may be made with a minimum height and breadth. The preassembled unit is supported by a rubber-to-metal bonded anti-vibration elements. This constitutes a further way of absorbing structure-borne noise and is not without a favorable effect on the overall noise level.

As part of a further feature of the invention the epicyclic gearing has at least four shafts and is so designed that in one operational range the drive input, the drive output and each hydraulic machine is able to respectively be caused to take effect on another shaft of the epicyclic gearing and preferably in another operational range at least one of the hydraulic machines adapted to selectively act as pumps and motors is able to be switched over by a clutch to another shaft. This makes it possible to operate in one such range in all running conditions of the vehicle so that the hydraulic machines have to handle minimum power, this being significant for the overall efficiency and furthermore for the reduction in the noise level.

The invention may be so designed that the housing has a opening with a cover into which an assembled unit may be inserted. This manner of construction involves a particularly swift and satisfactory assembly of the transmission unit with hydromechanical components into the housing.

The hydraulic machines adapted to selectively act as pumps and motors with the epicyclic gearing are joined together by coupling means, as for example rubber-metal bonded units, allowing for axial mismatch, angular mismatch and torsion. This makes possible an optimum compensation of inaccuracies in assembly and the damping of the vibrations that are transmitted. As a further way of creating a favorable assembly environment the elastic couplings are enclosed by cover shells, are arranged in front of the housing and are able to be assembled by way of longitudinally inserted shafts from the end faces. The units inserted in an upward or downward direction may then be connected together in this manner without any obstruction. Furthermore, the cover shells prevent the radiation of sound from the front wall of the housing.

An inserted tubular connection, insulated as regards vibrations and preferably made with a joint, is arranged between the housing and the control or connection piece for insertion for the preassembled unit. It is here that the oil under pressure coming from the feed pump via the oil filter is passed through the housing into the control and connection block. The design of the connecting parts is such that even vibrations of tubes are not able to be transmitted to the outside. The connections with the cooler or fluid accumulator may be designed on the same lines.

Further advantages and features of the invention will be seen from the claims, the specification and the drawings.

LIST OF THE SEVERAL VIEWS OF THE DRAWINGS

DETAILED ACCOUNT OF THE INVENTION

Figure 1:
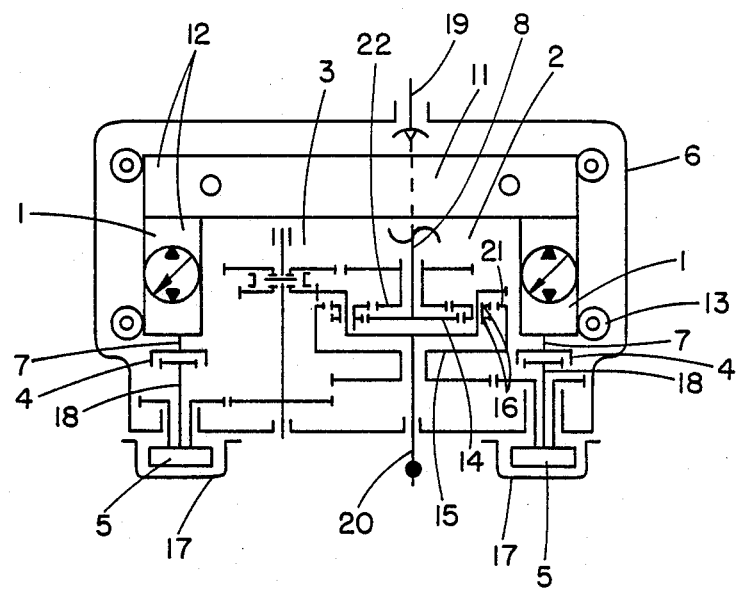
FIG. 1 shows a transmission embodying the invention in a diagrammatic plan view.

FIG. 1 shows two hydraulic machines adapted to selectively act as pumps and motors 1 which are securely connected to a control or connection block 11 to form a subassembly (or preassembled unit) 12, which may also be regarded as a yoke. The hydraulic machines adapted to selectively act as pumps and motors 1 are drivingly connected via arcuate teeth couplings 4 and elastic couplings 5, via different gearing with epicyclic gearing 2. The transmission elements are accommodated in a housing 6, the preassembled unit or subassembly 12 being carried in a vibration-proof manner by way of four rubber-metal bonded mounts 13 in the housing 6. The epicyclic gearing 2 is preferably composed of a four-shaft double planetary wheel set. The solar wheel 14 is connected with the drive shaft 19 of the engine and the carrier 15 of the planetary wheels 16 is connected with the output shaft 20. One hydraulic machine is always kept connected with the annulus 21 and the other is connected, during the starting range of operation, with the output shaft 20 and, in a second operational range, with the small solar wheel 22 by means of a clutch forming part of a change speed gearbox of an intermediate shaft 3. The housing 6 has an aperture for the insertion or sliding in of the hydraulic transmission unit so that there are no problems in this connection and with the assembly thereof. The elastic couplings 5 are connected via inserted shafts 18 with the arcuate teeth clutches 4 and the output shafts 7 of the hydraulic machines adapted to selectively act as pumps and motors. In order to check the radiation of sound from the end of the arrangement, there are cover shells 17 over the elastic clutches 5.

Figure 2:
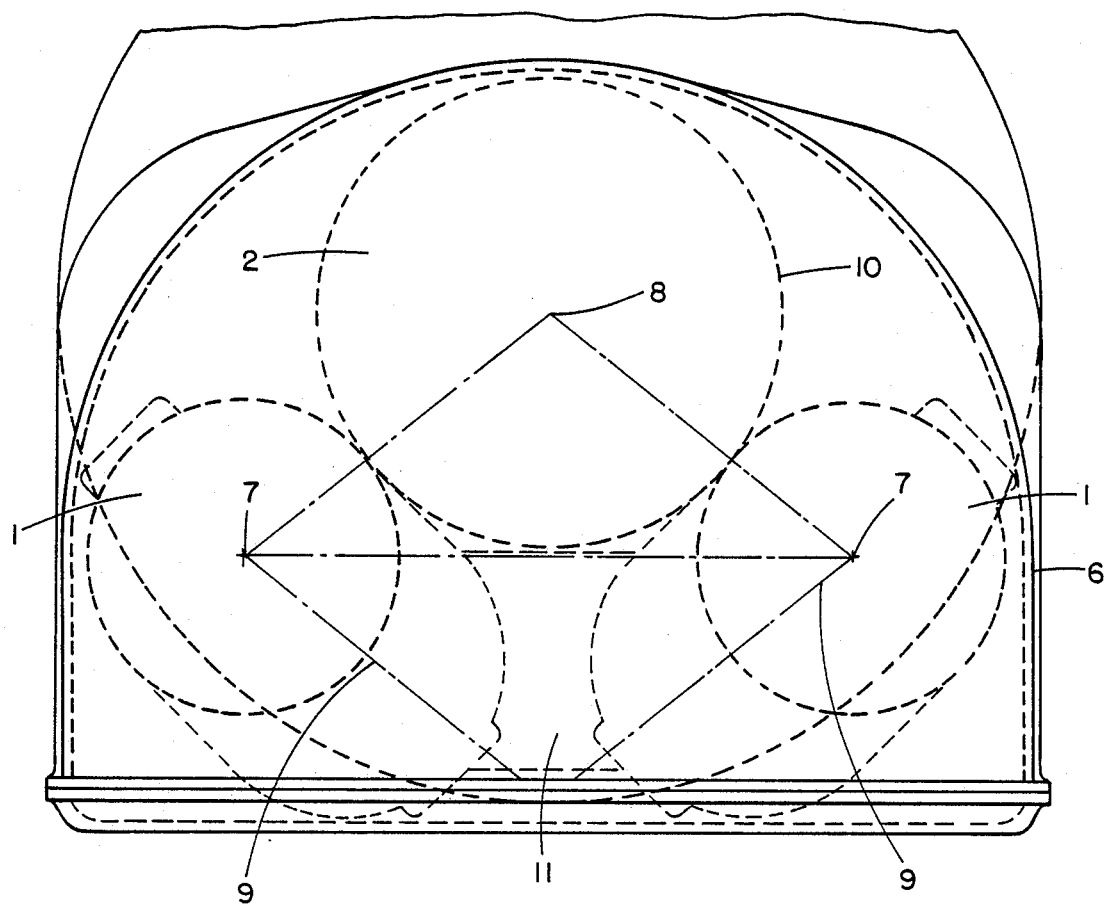
FIG. 2 is a front view of the transmission of FIG. 1.

FIG. 2 shows a front view of the transmission omitting the intermediate shaft and more particularly emphasizing the association of the epicyclic gearing and the hydraulic machines adapted to selectively act as pumps and motors so that one may see that the lines connecting the axes form a triangle. If the hydraulic machines adapted to selectively act as pumps and motors have bent shafts 9, as is frequently the case with popular designs of such machines, such shafts are aligned so as to be generally tangential to the enveloping circle 10 of the epicyclic gearing, preferably at 45°. This ensures a minimum space requirement for all the elements with the least possible height and breadth dimensions. This applies more especially for the complex structural form of the hydraulic machines adapted to selectively act as pumps and motors.

We claim:

1. Hydromechanical transmission, especially for vehicles having a common housing for at least two hydromechanical machines and an epicyclic gearing; comprising in combination:
   (a) said transmission including an epicyclic gearing in alignment with the engine output shaft and drive output shaft; at least two adjustable hydromechanical machines arranged axially-parallel with said epicyclic gearing; a control end connecting block; an intermediate shaft with a speed changing gearbox and a plurality of clutches;
   (b) the axes of said hydromechanical machines and the epicyclic gearing being arranged to form a triangle, and said hydromechanical machines having peripheral contours tangential to the enveloping curve of said epicyclic gearing;
   (c) said epicyclic gearing having four shafts and in at least one operating range the drive input and drive output and each hydromechanical machines are presently operatively connectable with another shaft of said epicyclic gearing, and at least one of said hydromechanical machines is switchable through a clutch into another operating range;
   (d) said hydromechanical machines and said control and connecting block being interconnected in a U-shape as a subassembly; and
   (e) wherein the components comprising said epicyclic gearing, intermediate shaft and subassembly being encompassed by said housing in closely spaced relationship therewith.

2. Transmission as claimed in claim 1, wherein said hydromechanical machines are of the bent axle type incorporating operating heads, said operating heads being at such an angle that the ends of the shafts thereof are generally tangential to and extend upwardly and downwardly relative to the envelope curve of the epicyclic gearing.

3. Transmission as claimed in claim 1, wherein said subassembly is a yoke in the shape of a C-component.

4. Transmission as claimed in claim 1, wherein rubber-metal anti-vibration mounts support said subassembly in said housing.

5. Transmission as claimed in claim 1, wherein said housing includes an opening; a cover for closing said opening, said subassembly being insertable into said housing through said opening.

6. Transmission as claimed in claim 1, wherein at least one vibration-insulated plug-in tube connection is insertable intermediate said housing and said control and connecting block.

* * * * *